Oct. 24, 1967    C. GIBBONS    3,349,262
SLOW SPEED MOTOR
Filed Sept. 25, 1964    2 Sheets-Sheet 1

INVENTOR
CHARLES GIBBONS
By Smart & Biggar
ATTORNEYS

Oct. 24, 1967  C. GIBBONS  3,349,262
SLOW SPEED MOTOR

Filed Sept. 25, 1964  2 Sheets—Sheet 2

INVENTOR
CHARLES GIBBONS.
By- Smart & Biggar
ATTORNEYS

United States Patent Office 3,349,262
Patented Oct. 24, 1967

3,349,262
SLOW SPEED MOTOR
Charles Gibbons, 9 Field Technical Training Unit R.C.A.F. Station, Greenwood, Nova Scotia, Canada
Filed Sept. 25, 1964, Ser. No. 399,241
19 Claims. (Cl. 310—37)

This invention relates to a device for controlling the output shaft speed of an electric motor.

Particularly this invention relates to motors of the kind comprising a member mounted for oscillation about an output member, electro-magnetic means being provided for oscillating the member and a clutch device connecting the oscillating member to the shaft. Such a motor is described on page 57 of the March 1963 issue of Popular Science.

It is an object of the present invention to provide an adjustable control whereby the angular deflection of the oscillating member may be predetermined, thereby controlling the amount of movement transmitted to the output member by the clutch, whereby the speed of the output member may be controlled.

More generally, this invention relates to an electric motor comprising an oscillating member, electro-magnetic means for oscillating the member, a clutch device connecting the oscillating member to an output member, a fixed oscillation limiting abutment located adjacent the oscillating member and separated therefrom by a buffer device and means adapted to selectively locate the buffer device relative to the output member, whereby the angle of oscillation of the oscillating member is determined, thereby controlling the speed of the output member.

Certain preferred embodiments of the invention will now be described by way of example with reference to the accompanying drawings wherein.

Figure 1:
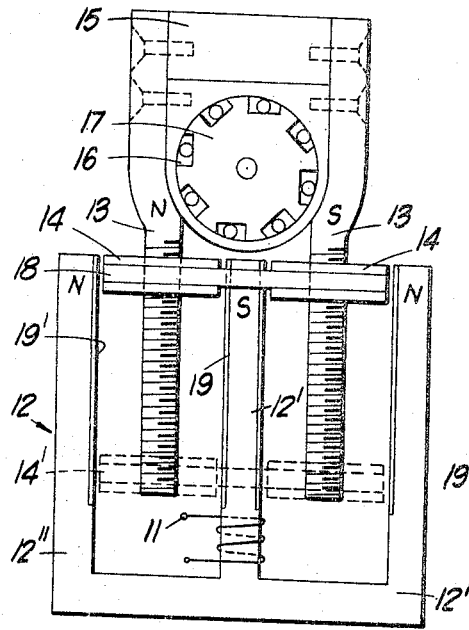
FIGURE 1 is an end view of one embodiment of the invention.
Figure 3:
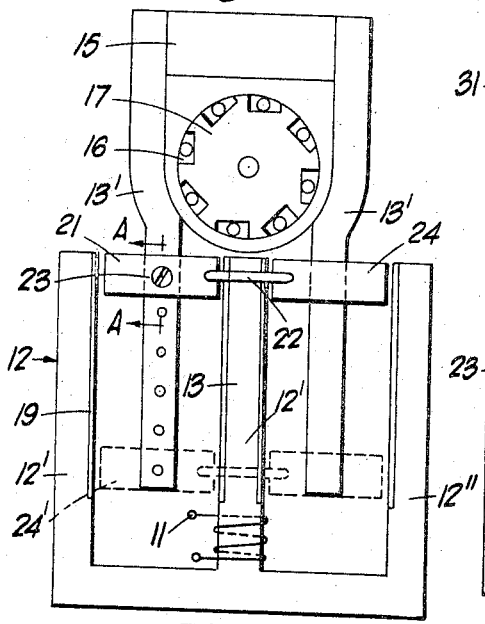
FIGURE 3 is an end view of a modification of the invention according to FIGURE 1.

Referring to FIGURES 1 and 3, in each of these embodiments a U-shaped member comprising a ferrite permanent magnet 15 and associated pole-pieces 13 and 13' respectively, is mounted for oscillation about a motor output member, in this case, a rotor shaft 17. The rotor shaft 17 is driven by oscillation of the U-shaped member under the influence of coil 11. The U-shaped member is connected in each case to rotor shaft 17 by means of a one-way roller bearing clutch device 16, commonly known as a sprag clutch, so that oscillation of the member in one direction only is translated to the rotor shaft, the return half of the oscillation not being translated so that the clutch acts in a manner similar to a ratchet. Thus the oscillating movement is transformed into an intermittent movement of the shaft in one direction, the shaft remaining stationary during the return swing of the oscillating member.

In the embodiments of FIGURES 1 and 3 the pole-pieces 13 and 13' lie within the outside legs 12" of a fixed E-shaped laminated frame 12, the middle leg 12' of the E-frame having the winding of coil 11 wound thereon. The coil is positioned beneath the free ends of the pole-pieces 13 and 13' of the magnet 15.

A buffer device comprising tapped pulleys 14, or sliding collars 24 are threadably mounted or fixed in position by a set-screw 23 respectively, upon pole-pieces 13 and 13' of the oscillating member. Thus the buffer device may be selectively positioned longitudinally on the pole-pieces, whereby the angular deflection of the oscillating U-shaped member may be varied. These buffer devices, for maximum efficiency are constructed of material of suitable magnetic permeability, preferably of the same material as that of the pole-pieces. Dotted lines 14' and 24' illustrate the slowest speed position of said device.

As shown in FIGURE 1, the buffer device comprises similar tapped pulleys. An endless belt or the like 18, of suitable non-magnetic material may be used as a connector between the pulleys, so that upon manual rotation of one pulley, synchronous longitudinal displacement of both pulleys is obtained.

In the embodiment of FIGURE 3, where smooth pole-pieces and sliding collars 13' and 24' respectively are used as the buffer device, adjustable securing means, such as set-screw 23 or a detent comprised of a spring-loaded ball 25 and 26 act as a holding device for securing at least one collar to pole-pieces 13'. Rigid connecting arms 22 of aluminum or other non-magnetic material join the sliding collars so that when the collar having the set-screw is moved longitudinally on the pole-piece, synchronous longitudinal displacement of the other collar is again ensured. It is understood that both sliding collars may be provided with suitable adjustable securing means.

Figure 5:
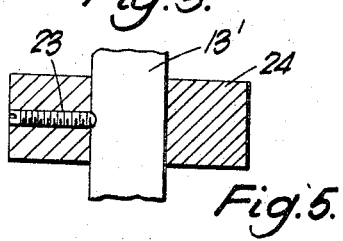
FIGURES 5 and 5A are details in section along the line A—A of FIGURE 3.
Figure 5A:
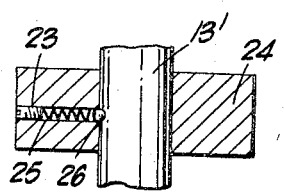

The mounting of set-screw 23 or spring 25 and ball 26 are shown in FIGURES 5 and 5A respectively.

Figure 2:
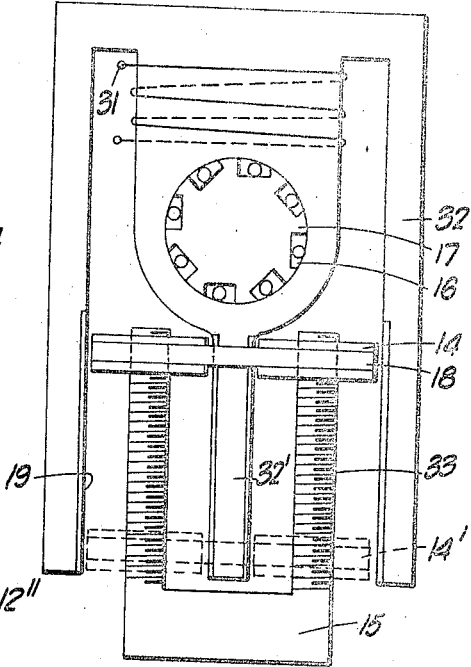
FIGURE 2 is an end view of an alternative embodiment of the invention.

In both cases as shown in FIGURES 1 and 2, the inside walls of the laminated E-shaped frame may be lined with a thin rubber-like or resilient material 19, to reduce noise and vibration.

Figure 4:
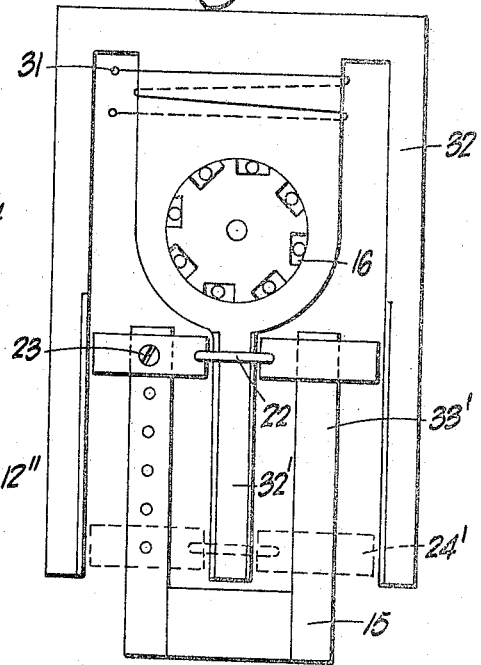
FIGURE 4 is an end view of a modification of the invention according to FIGURE 2.

Referring now to FIGURES 2 and 4 which show a second embodiment of the invention, 33 and 33' represent the associated pole-pieces of a ferrite permanent magnet 15 comprising a fixed U-shaped member. Centrally positioned within and flanking the legs of the U-shaped member, a substantially E-shaped laminated frame 32 is mounted for oscillation on a rotor shaft 17. The oscillating movement of the frame 32 is transmitted to the rotor shaft as before, through a one-way roller-bearing clutch device 16. The E-shaped frame 32 is of the same general construction as described in FIGURE 1, being of suitable magnetic material with the middle leg 32' carrying a coil or winding 11.

Again, buffer devices comprising tapped pulleys 14 or sliding collars 24 as illustrated in FIGURES 2 and 4 respectively, are mounted as before on threaded or smooth pole-pieces 33 and 33' of the magnet 15. The dotted lines 14' and 24' illustrate the position for slowest speed.

In FIGURE 1, instantaneous values of polarity of the pole-pieces of the oscillating member and the permanent condition of the pole-pieces of the magnet 13 are indicated. Upon energization of the coil from a 60 cycle A.C. main, the outside legs of the E-shaped frame 12" have north polarity and the middle leg 12', upon which the coil 11 is wound, has a south polarity. With respect to the fixed E-shaped frame 12, the movable U-shaped member which is magnetic is rotated about the shaft 17 in a counter-clockwise direction as a result of the instantaneous polarity and the attractive-repulsive forces acting between the respective pole-pieces 13 of the magnet 15 and the flanking legs 12" of the E-shaped frame. Upon change in polarity of the field produced by the electro-magnet, the U-shaped member reverses its direction and rotates about the shaft 17 in a clockwise direction.

The amount of angular movement of the oscillating member in either clockwise or counter-clockwise direction is limited by the flanking legs 12" of the E-shaped frame which act as stops, against which the threadably mounted buffer device abuts. The selected longitudinal position of buffer device 14 thereby determines the desired angle of oscillation. This oscillation is translated intermittently to the output shaft through the roller bearing clutch device 16.

Since the longitudinal position of the buffer device 14 on the pole-piece 13 determines the amount of angular movement of the U-shaped member during one-half cycle it also controls the speed of the output shaft 17 since it controls the amount of angular movement of the output shaft 17 during one cycle.

It can be seen that the embodiments illustrated in FIGURES 2, 3 and 4 work in a fashion similar to the embodiment of FIGURE 1.

In the embodiments of the invention illustrated in FIGURES 1–4, it can be seen that the permanent magnet may be replaced by an electro-magnet suitably excited from a D.C. supply or D.C. obtained from A.C. by rectification, in a manner to be described.

Figure 6:
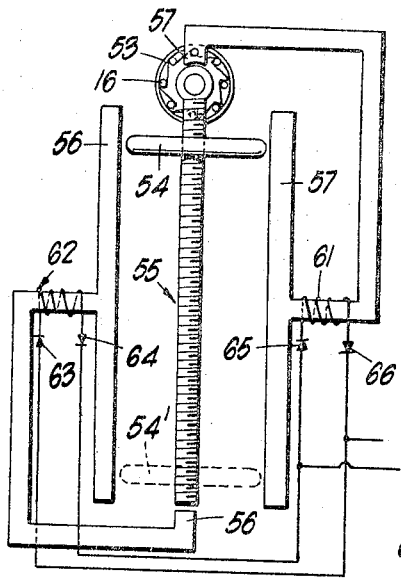
FIGURE 6 is an end view of a further embodiment of the invention.
Figure 8:
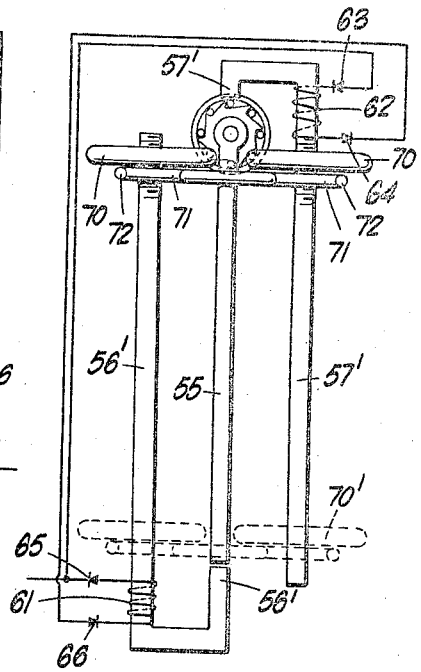
FIGURE 8 is an end view of yet another embodiment of the invention.

Referring now to FIGURE 6 which shows a modified embodiment of the invention, 55 is a magnetically permeable, longitudinally extending member mounted for oscillation about the axis of the motor output member, in this case annular sleeve 53, under the influence of the magnetic field induced by windings or coils 61 and 62 respectively. The member 55 is connected to sleeve 53 by means of a conventional sprag clutch 16. As in the previous examples, motion of the oscillating member is intermittently translated into unidirectional rotation of the output member 53.

In the embodiment of FIGURE 6, the oscillating member 55 lies within fixed pole-pieces 56 and 57 respectively, constituting frame members, fixed relative to the output member, upon which coils 62 and 61 are wound.

In operation, the coils 62 and 61 are alternately energized by half-wave rectified current, provided by diodes 63, 64, 65 and 66 supplied from an A.C. source. Alternative rectifying means may be used.

A buffer device, comprising a magnetically permeable pulley 54 is threadably mounted upon oscillating member 55 and again may be selectively positioned longitudinally of the oscillating member, so that the angular deflection of the member 55 may be controlled. The slowest speed position of the buffer device is illustrated by dotted line 54'.

For purposes of providing a greater speed between the fastest and slowest output shaft speeds, pole-pieces 56 and 57 may be divergently arranged so that the pole-pieces are approximately $\frac{1}{16}$" farther apart at the clutch end of the poles than at the other end.

It will be evident that the thread on the oscillating member may be replaced by detents and the tapped pulley replaced by a sliding collar of the type previously described, thereby providing for various fixed-speed positions of the buffer device.

Figure 7:
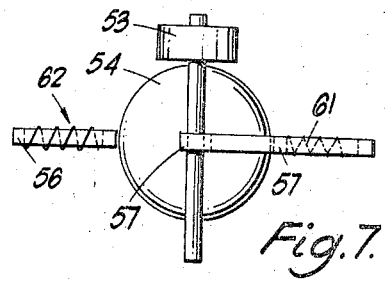
FIGURE 7 is a plan view of the embodiment shown in FIGURE 6.
Figure 9:
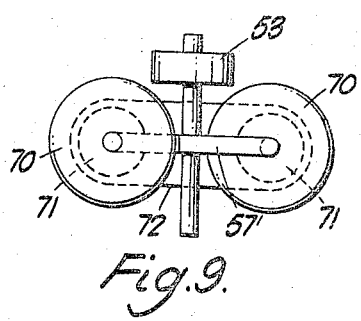
FIGURE 9 is a plan view of the embodiment shown in FIGURE 8.

In the embodiment of the invention illustrated in FIGURE 7, the buffer device comprises tapped pulleys 70, 71 threadably mounted upon pole-pieces 56' and 57'. By means of belt 72, the pulleys are adjustable simultaneously, longitudinally of the pole-pieces, thereby providing for control of the angular deflection of the oscillating member 55. The slowest speed position of the buffer device is illustrated by dotted line 70'.

Again, for purposes of providing a greater spread between the fastest and slowest speed positions of the buffer device, oscillating member 55 may be tapered, such that the taper is narrowest at the clutch end of the member than at the other end. A suitable taper is approximately $\frac{1}{16}$" per 6" of the member. The thread on the pole-pieces may be replaced, as before, by detents and the tapped pulleys replaced by sliding collars.

It is contemplated that continuous movement of an output member can be provided by use of two motors of the type described, connected to a common output member and working in opposite mechanical phase to each other.

The embodiments of the invention in which an exclusive property or privilege is claimed are defined as follows:

1. An electric motor comprising an oscillating member; electromagnetic means for oscillating said member; a one-way clutch connecting said member to an output shaft, said member extending outwardly of said shaft; fixed oscillation limiting abutment means spaced from said member and extending generally parallel thereto; a buffer device mounted for longitudinal movement of one of said member and said abutment means and interposed therebetween; and means to selectively move said buffer device towards and away from said shaft, whereby to determine the angle of oscillation of the oscillating member and control the speed of the shaft.

2. An electric motor as claimed in claim 1, wherein said oscillating member is tapered longitudinally.

3. An electric motor as claimed in claim 1, wherein said oscillating member comprises magnetic means having associated pole-pieces whereon said buffer device is mounted.

4. An electric motor as claimed in claim 3, wherein said pole-pieces are externally threaded and said buffer device comprises a pair of buffer members, each buffer member being threadably mounted on one of said pole-pieces respectively.

5. An electric motor as claimed in claim 4 wherein the means to selectively move said buffer device include mechanical connections between the buffer members providing for synchronous adjustment thereof.

6. An electric motor as claimed in claim 3, wherein said pole-pieces are smooth and said buffer device comprises collar means slidably mounted thereon.

7. An electric motor as claimed in claim 3 wherein the pole pieces are smooth and said buffer device comprises collar means slidably mounted thereon, said means for selectively moving said buffer device including means for locking said collar means in a variety of positions along each associated pole piece.

8. An electric motor as claimed in claim 2, wherein said pole-pieces are tilted relative to the longitudinal axis of the oscillating member.

9. An electric motor as claimed in claim 1, wherein said electromagnetic means includes a frame of magnetic material, and wherein said frame forms said abutment means.

10. An electric motor as claimed in claim 1, wherein said abutment walls are lined with a noise-reducing material.

11. An electric motor as claimed in claim 1, wherein said abutment means comprises magnetic means having associated pole-pieces whereon said buffer device is mounted.

12. An electric motor as claimed in claim 11, wherein said pole-pieces are externally threaded and said buffer device comprises a pair of buffer members each buffer member being threadably mounted on one of said pole-pieces.

13. An electric motor as claimed in claim 12 wherein the means to selectively move said buffer device include mechanical connections between the buffer members providing for synchronous adjustment thereof.

14. An electric motor as claimed in claim 11, wherein said pole-pieces are smooth and said buffer device comprises collar means slidably mounted thereon.

15. An electric motor as claimed in claim 14 wherein the pole pieces are smooth and said buffer device comprises collar means slidably mounted thereon, said means for selectively moving said buffer device including means for locking said collar means in a variety of positions along each associated pole piece.

16. An electric motor as claimed in claim 13, wherein said sliding collars are mechanically connected for synchronous adjustment.

17. An electric motor as claimed in claim 1, wherein said buffer device is comprised of material of suitable magnetic permeability.

18. An electric motor as claimed in claim 1, wherein said electromagnetic means comprises alternately energized coil windings mounted on pole-pieces and wherein said pole-pieces form said fixed oscillation-limiting abutment means.

19. An electric motor as claimed in claim 18, wherein energization of said windings is controlled by rectifier means.

References Cited

UNITED STATES PATENTS

| | | | |
|---|---|---|---|
| 2,430,628 | 11/1947 | Whitehead | 58—112 |
| 2,589,959 | 3/1952 | Quick | 310—39 |
| 2,785,323 | 3/1957 | Fuchs | 310—19 X |
| 3,131,812 | 2/1964 | Mac Authur | 310—49 |
| 3,202,849 | 8/1965 | Neal | 310—37 |
| 3,302,045 | 1/1967 | Dotto | 310—37 |

MILTON O. HIRSHFIELD, *Primary Examiner.*

D. F. DUGGAN, *Assistant Examiner.*